United States Patent
Morii et al.

(10) Patent No.: US 7,438,104 B2
(45) Date of Patent: Oct. 21, 2008

(54) RADIAL TIRE

(75) Inventors: Takao Morii, Kodaira (JP); Sumito Nakagawa, Kawasaki (JP); Naohiko Obana, Kuroiso (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/853,674

(22) Filed: May 14, 2001

(65) Prior Publication Data

US 2001/0054466 A1  Dec. 27, 2001

(30) Foreign Application Priority Data

May 12, 2000  (JP)  ............................. 2000-140975
Jun. 21, 2000  (JP)  ............................. 2000-186753

(51) Int. Cl.
*B60C 9/00* (2006.01)
*B60C 9/18* (2006.01)

(52) U.S. Cl. ...................... 152/526; 152/527; 152/531; 152/532; 152/533; 152/535; 152/536

(58) Field of Classification Search ................. 152/526, 152/527, 531, 532, 533, 535, 536
See application file for complete search history.

(56) References Cited

U.S. PATENT DOCUMENTS

| | | | | |
|---|---|---|---|---|
| 3,929,180 A | * | 12/1975 | Kawase et al. ............... | 152/556 |
| 4,371,025 A | | 2/1983 | Canevari et al. | |
| 5,154,217 A | * | 10/1992 | Kanamaru ................... | 152/527 |
| 5,198,307 A | * | 3/1993 | Bourgois et al. ............ | 428/589 |
| 5,234,044 A | | 8/1993 | Bourgois | |
| 5,743,975 A | * | 4/1998 | Sinopoli et al. ............. | 152/527 |
| 6,012,498 A | * | 1/2000 | Koch .......................... | 152/197 |

FOREIGN PATENT DOCUMENTS

| | | | |
|---|---|---|---|
| DE | 2734586 | * | 2/1979 |
| EP | 0 414 892 A1 | | 3/1991 |
| EP | 0 425 318 A2 | | 5/1991 |
| EP | 0 937 588 A2 | | 8/1999 |
| JP | 11-78410 | * | 3/1999 |
| JP | 11-78411 | * | 3/1999 |

OTHER PUBLICATIONS

Mechanics of Pneumatic Tires, US Department of Transportation, Aug. 1981, p. 881.*

* cited by examiner

*Primary Examiner*—Justin Fischer
(74) *Attorney, Agent, or Firm*—Sughrue Mion, PLLC

(57) ABSTRACT

A rubber-covered belt ply forms a belt layer. At least a majority of metal wires in the ply exist as metal wire bundles in which a plurality of metal wires of circular cross-sections and substantially equal wire diameters are aligned in parallel without being twisted together, the metal wire bundles being aligned planarly and in parallel with intervals between the metal wire bundles in a transverse direction. At least one layer, which is a cap layer in which organic fibers are covered with rubber and/or a reinforcing layer which is formed of rubber or whose main component is rubber, is disposed between the belt layer and a tread.

18 Claims, 5 Drawing Sheets

RADIAL TIRE

BACKGROUND OF THE INVENTION

1. Field of the Invention

The present invention relates to a radial tire by which a lighter-weight structure is achieved without a deterioration in any of the performances of the tire, and in particular, to a radial tire which is suitable for use as a radial tire for a passenger vehicle.

2. Description of the Related Art

In recent years, the demand to reduce the weight of tires in order to improve the fuel economy of automobiles has become stronger. Many techniques have been disclosed as effective means for reducing the weight of a tire in which attention is focused on the steel cords for belt reinforcement using the metal wires as cords for the belts without being twisted. For example, Japanese Patent Application Laid-Open (JP-A) Nos. 8-218283 and 11-91311 disclose techniques of forming metal wires with spiral shapes or wave shapes. JP-A Nos. 4-19201 and 9-323503 propose techniques relating to use of single wire cords and the arrangement thereof. However, with all of these techniques, there is the concern that, under rigorous use, fracture of the metal wires or separation at the belt end portions may occur. Further, JP-A No. 11-291710 discloses a belt ply including strands in which metal wires which are not twisted are aligned. However, this technique is substantially the same as conventional twisted cord structures, and the effect of lightening the weight of the tire cannot be so much expected therefrom.

The applicant of the present application has previously proposed: a technique of suppressing the growth and propagation of cracks generated at the belt end portions by discretely disposing a plurality of monofilament bundles (JP-A No. 4-95505), a technique of improving belt durability by spacing apart bundles of a plurality of monofilaments, and in each of the bundles, creating an arrangement in which the monofilaments are slightly spaced apart locally (JP-A No. 4-95506); and an optimal embedding density of monofilament bundles each containing 5 to 6 filaments (JP-A No. 10-292275). However, when a structure approaches a state in which metal wires are aligned in a single row along the width direction of the belt layer, i.e., when the degree of flatness of the metal wire bundle becomes high, the belt rigidity decreases, and it is easy for the belt to be broken or for belt layer separation to occur, such that the durability of the tire deteriorates. Further, due to such a deterioration in belt rigidity, the rolling resistance at the time of high speed travelling increases. Thus, the above-described conventional techniques still have many problems which have not been solved.

In order to address the need to lighten the weight of the tire, untwisted metal wires are used in the belt for tire reinforcement, and at the same time, problems relating to the tire performances, such as the aforementioned problems of fracture of the metal wires, separation at the belt layer, a deterioration in rolling resistance, and the like are yet to be solved.

SUMMARY OF THE INVENTION

An object of the present invention is to provide a radial tire in which problems of the conventional art such as those described above are overcome, which is lighter-weight, and in which a deterioration in performances of the tire which usually accompanies a lightening of the weight of the tire can be strongly suppressed or such performances can even be improved.

The present invention was developed to overcome the above-described problems, and was achieved as a result of diligent studies relating to the structure and materials of a belt for tire reinforcement using untwisted metal wires, as well as the structure of an effective reinforcing layer. In accordance with a first aspect of the present invention, a radial tire comprises: a carcass layer formed of at least one radial carcass ply disposed between a pair of bead members; a tread disposed at a tire radial direction outer side of a crown region of the carcass layer, and forming a ground-contact portion; and a belt layer formed of at least two belt plies each formed from rubber-coated metal wires, and disposed between the tread and the crown region of the carcass layer, wherein the belt layer is structured such that, in at least one belt ply of the belt layer, at least a majority of metal wires in the ply exist as metal wire bundles in which a plurality of metal wires of circular cross-sections and substantially equal wire diameters are aligned in parallel without being twisted together, the metal wire bundles being aligned planarly and in parallel with intervals between the metal wire bundles in the width direction of the belt layer.

In a second aspect of the present invention, the radial tire of the first aspect further comprises a reinforcing layer which is formed of organic fibers covered with rubber and/or a reinforcing layer which is formed of rubber or whose main component is rubber, the reinforcing layer being disposed between the tread and the belt layer.

In a third aspect of the present invention, the belt layer is formed of two belt plies.

In a fourth aspect of the present invention, the belt layer is structured such that, in all of the belt plies of the belt layer, at least a majority of metal wires in the ply exist as metal wire bundles in which a plurality of metal wires of circular cross-sections and substantially equal wire diameters are aligned in parallel without being twisted together, the metal wire bundles being aligned planarly and in parallel with intervals between the metal wire bundles in the width direction of the belt layer.

In a fifth aspect of the present invention, a value of an aspect ratio $D_S/D_L$ of a short diameter $D_S$ to a long diameter $D_L$ of the metal wire bundle in a cross section orthogonal to the longitudinal direction of the metal wire bundle is substantially $1/n$, where n is a number of metal wires in the metal wire bundle.

In a sixth aspect of the present invention, a number n of metal wires in the metal wire bundle is 2 to 6.

In a seventh aspect of the present invention, a wire diameter of the metal wires in the belt layer is 0.18 to 0.35 mm, and a tensile strength of the metal wires in the belt layer is 3130 to 4410 MPa.

In an eighth aspect of the present invention, a wire diameter of the metal wires in the belt layer is 0.19 to 0.28 mm, and a tensile strength of the metal wires in the belt layer is 3430 to 4410 MPa.

In a ninth aspect of the present invention, a material of the metal wires in the belt layer is a steel material containing at least 0.7% by weight carbon.

In a tenth aspect of the present invention, the belt layer is formed of two belt plies, and given that $G_1$ is a total thickness of the two plies, $G_2$ is an interval between metal wires of a radial direction inner side ply and metal wires of a radial direction outer side ply, and $\delta G$ is an interval between the metal wire bundles in each ply, relationships of the following formulas are satisfied:

$$1.00 \text{ mm} \leq G_1 \leq 2.00 \text{ mm} \quad (1)$$

$$0.32 \text{ mm} \leq G_2 \leq 0.65 \text{ mm} \quad (2)$$

$$0.25 \text{ mm} \leq \delta G \leq 1.00 \text{ mm} \quad (3).$$

In an eleventh aspect of the present invention, the metal wires in the belt layer form an angle of 15 to 35° with respect to an equatorial plane of the tire.

In a twelfth aspect of the present invention, the organic fibers in the cap layer are aligned substantially parallel to a tire circumferential direction.

In a thirteenth aspect of the present invention, a material of the organic fibers in the cap layer is polyethylene naphthalate.

In a fourteenth aspect of the present invention, a material of cords of the radial carcass ply is polyethylene naphthalate.

In a fifteenth aspect of the present invention, at least one reinforcing layer, which is formed of rubber or whose main component is rubber, is disposed between the tread and the belt layer.

In a sixteenth aspect of the present invention, at least one reinforcing layer, which is formed of rubber or whose main component is rubber, is disposed between the cap layer and the belt layer.

In a seventeenth aspect of the present invention, a width, in a tire width direction, of the reinforcing layer is 70 to 110% of a width, in a tire width direction, of a tire radial direction innermost side belt ply.

In an eighteenth aspect of the present invention, a thickness of the reinforcing layer is 0.2 to 1.2 mm.

In a nineteenth aspect of the present invention, a thickness of the reinforcing layer is 0.3 to 0.8 mm.

In a twentieth aspect of the present invention, a 100% tensile stress of rubber portions of the reinforcing layer is 1.0 to 8.0 MPa.

In a twenty-first aspect of the present invention, a 100% tensile stress of rubber portions of the reinforcing layer is higher than a 100% tensile stress of rubber of the tread.

In a twenty-second aspect of the present invention, the reinforcing layer whose main component is rubber contains short organic fibers or short metal fibers.

DETAILED DESCRIPTION OF THE PREFERRED EMBODIMENTS

First Embodiment

A radial tire relating to a first embodiment of the present invention will be concretely described hereinafter with reference to FIGS. 1 through 6.

Figure 1:
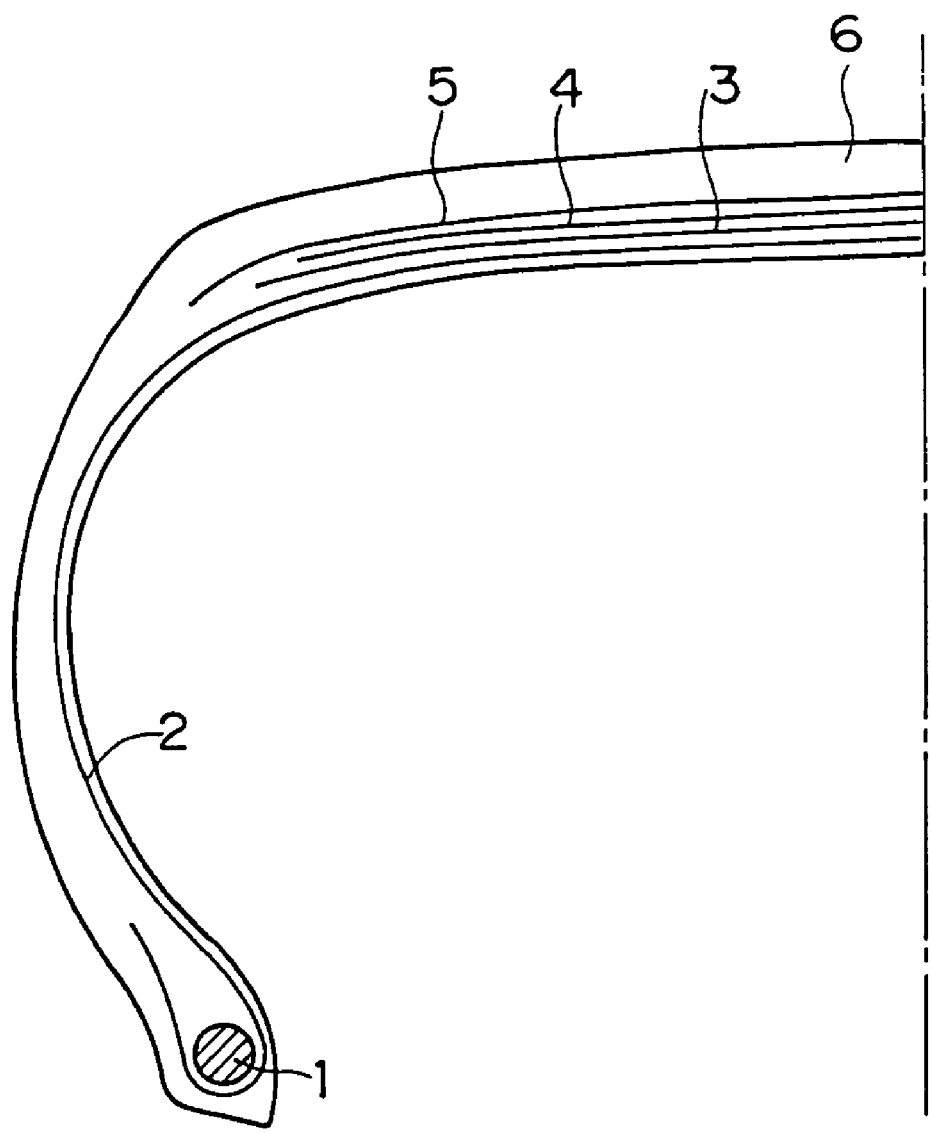
FIG. 1 is a cross-sectional view of a left half of a radial tire in accordance with a first embodiment of the present invention.

The left half cross-sectional view of FIG. 1 shows an example of a radial tire in accordance with the present embodiment. The radial tire basically includes a carcass layer 2 which is formed of at least one radial carcass ply disposed between a pair of bead members 1, a tread 6 disposed at the tire radial direction outer side of a crown region of the carcass layer and forming a ground-contact portion, and a belt layer formed of at least two belt plies (here, belt plies 3, 4) which are formed of rubber-coated metal wires and which are disposed between the tread and the crown region of the carcass layer.

Figure 2:
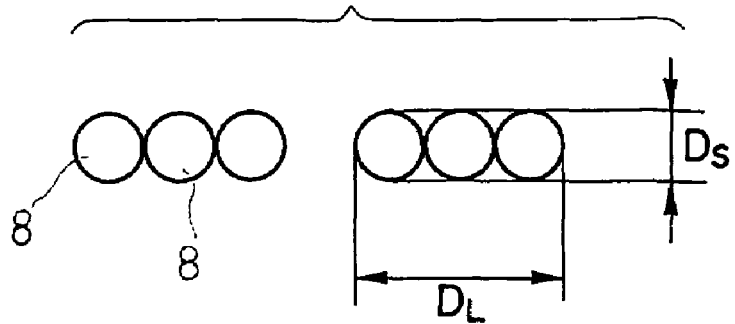
FIG. 2 is a sectional view of a bundle of three metal wires in accordance with the present invention.
Figure 3:
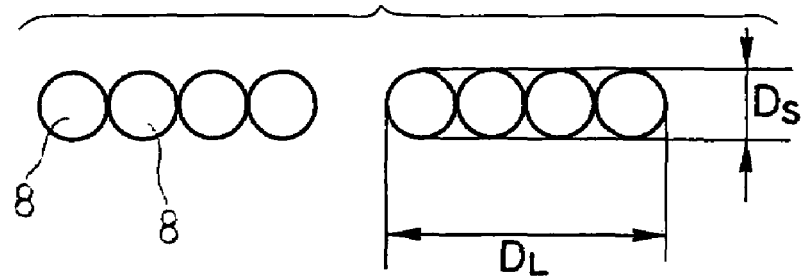
FIG. 3 is a sectional view of a bundle of four metal wires in accordance with the present invention.

In at least one belt ply of the belt layer, as shown in FIG. 2 or FIG. 3, at least the majority of the metal wires 8 in the ply exist as metal wire bundles in which a plurality of metal wires 8 of circular cross-sections and substantially equal wire diameters are aligned in parallel without being twisted together. (FIG. 2 illustrates bundles of three metal wires, and FIG. 3 illustrates bundles of four metal wires.) The belt layer is formed with the metal wire bundles being aligned planarly and in parallel with intervals between the bundles in the transverse direction.

Further, at least one cap layer 5, in which organic fibers are covered with rubber, is disposed between the tread 6 and the belt layer.

Generally, the number of the plural belt plies forming the belt layer is selected in accordance with the load resistance characteristic required of the tire. However, for application to a passenger vehicle, usually two belt plies in which two sets of the metal wires within the plies intersect with each other symmetrical with the equator therebetween, are optimally used.

Accordingly, in the present embodiment as well, a structure in which the belt layer is a two-layer structure as described above is advantageous in practice. In this case, at radial direction inner side and outer side plies, the arrangement of the metal wire bundles in the belt layer width direction are offset from one another. This is advantageous in practice, from the standpoint of preventing local concentration of stress and improving the durability and wear resistance.

Figure 4:
FIG. 4 is a sectional view of a conventional wire structure in which metal wires are arranged at equal intervals.
Figure 5:
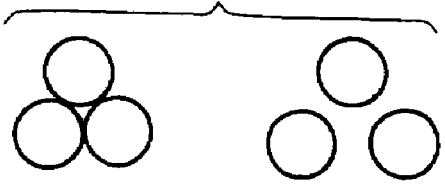
FIG. 5 is a sectional view of a conventional cord structure in which metal wires are twisted together in a 1×3 structure.
Figure 6:
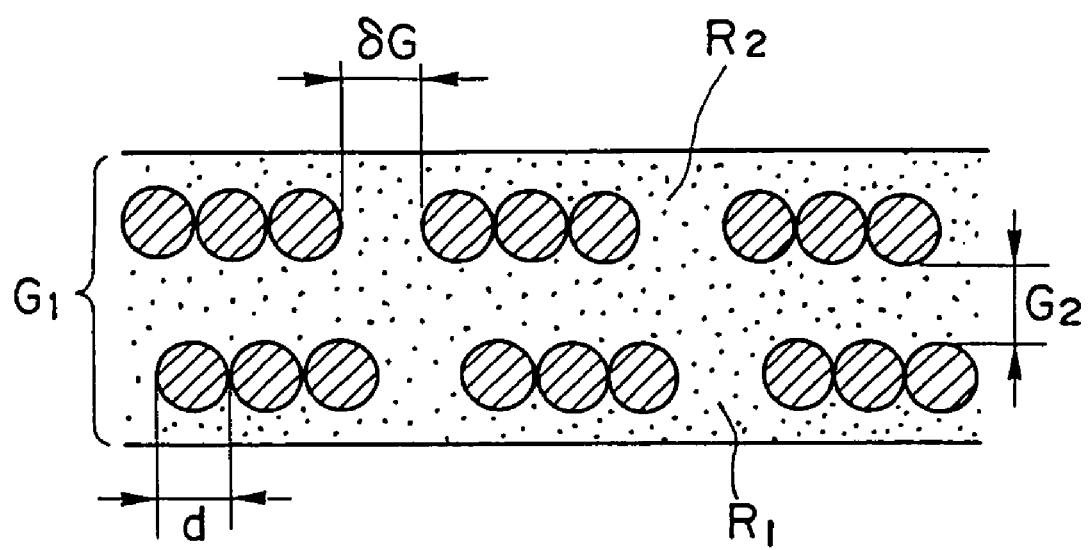
FIG. 6 is a longitudinal direction sectional view of a belt layer formed of two belt plies in which arrangements of bundles of three metal wires in accordance with the present invention are covered with rubber.

Conventional belt layers often use belt plies in which, as shown in FIG. 4, single metal wires are separated with intervals therebetween, or in which, as shown in FIG. 5, metal wire twisted cords are separated with intervals therebetween, and the single metal wires or cords are embedded substantially uniformly in a covering rubber. In contrast, in at least one belt ply of the belt layer of the present embodiment, the plurality of metal wires exist as metal wire bundles in which the single metal wires are aligned in parallel without being twisted, and these metal wire bundles are aligned planarly and in parallel with intervals between the respective bundles in the transverse direction, and are embedded in a covering rubber. Due to rubber portions existing in the intervals between the bundles, the belt layer of the present embodiment can effectively suppress the generation and propagation of separation.

In the present embodiment, from the standpoint of increasing the rigidity of the belt and of improving the tire properties and lifespan, it is most preferable that the belt layer is formed such that: as described above, in at least one belt ply in the belt layer, at least the majority of the metal wires in the ply form bundles in which a plurality of metal wires of circular cross-sections and substantially the same wire diameter are aligned in parallel without being twisted together; and that the metal wires substantially contact one another along the entire lengths thereof; and that the metal wire bundles are aligned planarly and in parallel with intervals between the bundles in the width direction of the belt layer.

Note that it is particularly preferable to achieve the above-described structure in all of the belt plies in the belt layer.

In particular, it is advantageous in practice that 80% or more, and preferably 90% or more, of all of the metal wire bundles are formed as aligned bundles such that, as shown in FIGS. 2 or 3, the value of a ratio $D_S/D_L$ of a short diameter $D_S$ to a long diameter $D_L$ of the metal wire bundle in a cross-section orthogonal to the longitudinal direction of the metal wire bundle is substantially 1/n or is 1/n (wherein n is a number of metal wires in the metal wire bundle), and that the metal wire bundles are aligned in parallel in the width direction of the belt layer. The more the value of this short diameter to long diameter ratio $D_S/D_L$ increases from a value of 1/n, the more the thickness of the rubber for covering the metal wire bundles increases. Thus, the effect of lightening the weight of the tire deteriorates. For this reason, it is desirable that, given that the diameter of the metal wire is d, at least the value of the short diameter $D_S$ is less than or equal to the value 1.5×d.

The number of metal wires in the metal wire bundle of the present embodiment is preferably from 2 to 6. There are no particular problems with respect to the tire performances if the number of metal wires in the bundle is increased. However, in the step of calendering the covering rubber at the metal wire cords, it is difficult to align the bundles of many metal wires (here, a bundle of seven or more metal wires are aligned in parallel without being twisted) planarly and in parallel within the belt ply with intervals between the bundles in the width direction of the belt layer, and produceability deteriorates. From the standpoints of both durability of the tire and produceability as a member, the number of metal wires in a bundle which is most advantageous in practice is 3 to 4.

The wire diameter of the metal wire used in the belt layer of the present embodiment is preferably 0.18 to 0.35 mm, and more preferably 0.19 to 0.28 mm. From the standpoint of making the tire more lightweight, the wire diameter should be made small and the weight of the wires should be reduced. However, if the wire diameter of the metal wire becomes too small, a large number of wires must be embedded in order to maintain belt strength, and the intervals between the bundles become small, and the belt separation resistance deteriorates. On the other hand, when the wire diameter of the metal wire is too large, the strain which is generated at the metal wire surface at the time the belt layer is subjected to fracturing deformation is great, and when there is a large amount of deformation such as at the time when the tire suddenly turns or the like, the metal wire filaments break easily.

The tensile strength of the metal wires of the present embodiment is preferably 3130 to 4410 MPa, and more preferably 3430 to 4410 MPa. When the tensile strength is less than 3430 MPa, and less than 3130 MPa in particular, in order to maintain belt strength, the number of metal wires which are used must be increased, and the tire cannot be made lighter-weight. Metal wires whose tensile strength exceeds 4410 MPa are difficult to manufacture, and are hard to mass produce.

In the belt layer of the present embodiment, single metal wires (monofilaments) which are not twisted are used. Metal cords having conventionally used twisted structures such as 1×3, 1×4, 1×5 and the like result in a decrease in strength of about 3% due to loss caused by the twisting. In the present embodiment, the rate of utilization of strength is higher, and thus, there is the advantage that the tensile rigidity in the initial stages in particular is high.

The material of the metal wires of the present embodiment is preferably a steel material containing at least 0.7% by weight carbon, and more preferably, at least 0.8% by weight carbon. A metal wire containing less than 0.7% by weight carbon has insufficient tensile strength as a belt reinforcing material of a tire. However, when the contained amount of carbon exceeds 0.9% by weight and becomes large, the wire drawing processing of the metal wire is difficult.

In the present embodiment, the bundles of metal wires are arranged planarly and in parallel in the width direction of the belt layer. Thus, by using a small amount of covering rubber and making the belt layer thin, it is possible to make a tire lighter-weight.

In a case in which the belt layer of the present embodiment is formed by two belt plies, it is preferable that the relationships of the following formulas are satisfied, wherein $G_1$ is the total thickness of the two plies, $G_2$ is the interval between the metal wires of the radial direction inner side ply and the metal wires of the radial direction outer side ply, and $\delta G$ is the interval between the metal wire bundles in each ply:

$$1.00 \text{ mm} \leq G_1 \leq 2.00 \text{ mm} \tag{1}$$

$$0.32 \text{ mm} \leq G_2 \leq 0.65 \text{ mm} \tag{2}$$

$$0.25 \text{ mm} \leq \delta G \leq 1.00 \text{ mm} \tag{3}$$

When $G_1$ is less than 1.00 mm, the belt treat becomes soft and the molding operation of the tire is difficult. When $G_1$ exceeds 2.00 mm, the thickness of the belt layer increases which is unsuitable for the object of decreasing the weight. When $G_2$ is less than 0.32 mm, the belt layer easily deforms due to inputs from the tire tread surface, and the belt durability decreases. $G_2$ exceeding 0.65 mm is unnecessary, and the advantage of lighter weight disappears. Further, if $G_2$ exceeds 0.65 mm, the rigidity in the direction within the tensile plane deteriorates with regard to the entire belt layer, and the maneuvering characteristics deteriorate. When $\delta G$ is less than 0.25, the generation and growth of belt end portion separation cannot be suppressed. When $\delta G$ exceeds 1.00 mm, due to the interval between the metal wire bundles becoming too large, the belt rigidity decreases, and the penetration resistance when the tire rides over nails or the like is poor.

The angle formed by the metal wires covered by rubber within the belt layer with respect to the equatorial plane of the tire is preferably 15° to 35°. When the angle formed with the equatorial plane is less than 15°, the durability is insufficient. When the angle formed with the equatorial plane exceeds 35° and becomes large, the rigidity in the belt circumferential direction decreases, which is not preferable for a radial tire.

One important characteristic of the radial tire of the present embodiment is that, as shown in the examples in FIG. 1 and FIG. 2, at least one cap layer 5, in which organic fibers are covered with rubber, is disposed between the tread and the belt layer. By providing the above-described belt layer and the cap layer, belt end portion separation and wire fracturing can be effectively suppressed, and a lightweight radial tire is provided in which the comfort of the ride and maneuvering stability are improved, and which has low rolling resistance and low sound.

From the standpoints of improving the maneuvering stability and decreasing the rolling resistance, it is preferable to arrange the organic fibers in the cap layer substantially parallel to the tire circumferential direction.

Nylon fibers, polyethylene terephthalate (PET) fibers, polyethylene naphthalate (PEN) fibers, rayon fibers, aramide fibers, and the like are used as the organic fibers used in the cap layer of the present embodiment.

If polyethylene naphthalate (PEN) fibers are used, the modulus in tension is very high as compared to nylon or PET. Thus, use of such fibers can compensate for the insufficient belt circumferential direction rigidity due to use of bundles of metal wires having relatively small diameters for the purpose of lightening weight in the present invention, and can effectively lower road noise.

PEN fiber cords used in the cap layer of the present embodiment preferably have a denier structure of 1500d/2 or 1000d/2, and the number of cords to be embedded is appropriately determined in consideration of the combination with the belt structure. As shown as an example in FIG. 1, the cap layer preferably is of a width which covers the entire width of the belt layer. However, the cap layer may be segmented in the width direction of the belt layer and provided at the both end portions of the belt layer.

Organic fibers such as mentioned above may be used for the cords of the radial carcass ply of the present embodiment. In this case, it is advantageous to use polyethylene naphthalate (PEN) fibers which have a high modulus of elasticity, rather than conventional nylon or PET fibers. In this way, the maneuvering stability and comfort of the ride of the tire can be greatly improved.

To summarize, in the radial tire of the present embodiment, bundles, in each of which a plurality of single metal wires (monofilaments) are disposed substantially planarly without being twisted, are aligned planarly and in parallel in the belt layer with intervals therebetween. In this way, a belt layer, which is lightweight and has high rigidity in the circumferential direction and which can suppress the generation and propagation of belt end portion separation, can be realized. Due to this improved belt layer, and to the organic fiber cap layer used together with the belt layer, it is possible to provide a high-performance, lightweight radial tire having improved rolling resistance, maneuvering stability, and comfort of ride.

EXAMPLES

Hereinafter, Examples of the present embodiment will be explained with reference to the drawings and the tables. In the present Examples, tires were prepared by applying to pneumatic radial tires having the structure shown in FIG. 1 and of the size 175/70R14, belt plies in which bundles (except for in Comparative Example 1) of metal wires as per the upper rows in Table 1 were disposed, such that the ratio $D_S/D_L$ of the short diameter to the long diameter of the cross-section of each of the bundles was 1/n (wherein n is the number of metal wires in the bundle). Here, the belt ply 3 and the belt ply 4 were a first belt ply 3, which was disposed at the crown portion radial direction outer side of the carcass layer 2 and in which the metal wires were inclined at an angle of 20° to the left with respect to the tire equatorial plane, and a second belt ply 4, which was disposed at the radial direction outer side of the first belt layer 3 and in which the metal wires were inclined at an angle of 20° to the right with respect to the tire equatorial plane. Here, Comparative Examples 1 and 2 lack cap layers. In Comparative Example 1, metal wires are uniformly embedded as shown in FIG. 4. Comparative Example 2 is an example using the three-wire bundles shown in FIG. 2. Examples 1 through 6 and 8 through 9 are examples in which, as shown in FIG. 2, three metal wires are bundled planarly and in parallel, and are embedded in the belt layer. Example 7 is an arrangement similar to that of the four-wire bundles shown in FIG. 3. Example 10 is not illustrated, but is an arrangement of seven-wire bundles.

The cap layer 5 is disposed at the radial direction outer side of the above-described belt layer. The cap layer 5 is formed by one layer of organic fiber cords in which polyethylene-2,6-naphthalate (PEN) organic fibers, which are disposed substantially parallel to the tire circumferential direction, are embedded in rubber. There are the following two types of specifications of the PEN fiber cords used in the cap layer.

(1) indicated deniers (D): 1500/2
number of embedded cords: 50 per 5 cm
number of twists up×down (times per 10 cm): 39×39
total thickness including covering rubber: 0.88 mm (2) indicated deniers (D): 1000/2
number of embedded cords: 58.5 per 5 cm
number of twists up×down (times per 10 cm): 39×39
total thickness including covering rubber: 0.75 mm The aforementioned twisted cords were subjected to an adhesive coating application (dipping) processing and a heat treatment under the following conditions. First, after being immersed in the dipping solution of RFL (resorcinol-formaldehyde latex) used in Example 1 of Japanese Patent Application Publication (JP-B) No.3-12503, the cords were subjected to a heat treatment for 60 to 160 seconds in a drying zone at 170° C. Then, the cords were heat-treated for 60 to 160 seconds at a temperature of 250 to 270° C. in a heat set chamber and a normalizing chamber. The cord tension in the heat set chamber was set to 0.4 to 1.1 g/d, and the cord tension in the normalizing chamber was set to 0.03 to 0.50 g/d. It is preferable to make adjustments such that the cord properties after the adhesive and heating processings are a tension of 2.25 g/d and a degree of elongation (JIS L1017) of 3.5% or less.

The specifications of the other organic fiber cords, i.e., the NY (nylon) and PET (polyethylene terephthalate) cords, used in the cap layer in Table 1 are as follows.

(Nylon Fibers)
indicated deniers (D): 1260/2
number of embedded cords: 50 per 5 cm
number of twists up×down (times per 10 cm): 39×39
total thickness including covering rubber: 0.83 mm (PET Fibers)
indicated deniers (D): 1500/2
number of embedded cords: 50 per 5 cm
number of twists up×down (times per 10 cm): 39×39
total thickness including covering rubber: 0.88 mm Further, the specifications of the PEN fiber cords used as the carcass cords were as follows.

(PEN Fibers)
indicated deniers (D): 1500/2
number of embedded cords: 50 per 5 cm
number of twists up×down (times per 10 cm): 44×44
total thickness including covering rubber: 0.88 mm Comparative Example 1 is a tire which utilizes a belt layer in which metal wires having a wire diameter of 0.21 are embedded uniformly, and does not have a cap layer, and in which PET fibers are used in the carcass cords. Evaluation of performances was carried out by using this tire of Comparative Example 1 as a control (an index of 100). The results of the tests on all of the Example tires and Comparative Example tires are shown in Table 1.

In the tires of Examples 1 through 3, cap layers formed of nylon fibers, PET fibers, and PEN fibers were disposed at the radial direction outer side of the belt layer using bundles of three metal wires. The tires of Examples 4 and 5 are an example using PEN fibers in the cap layer and carcass cords, and an example varying the number of deniers of the PEN fiber cords in the cap layer. In the tire of Example 6, the wire diameter of the metal wires which are bundled in groups of three is changed to 0.26 mm, and accordingly, the interval δG between the metal wire bundles is set wider to 0.62 mm. The tire of Example 7 is an example in which metal wires having a wire diameter of 0.21 mm are bundled in groups of four.

The tire of Comparative Example 2 is an example in which metal wires, which have a wire diameter of 0.21 mm in the same way as in Comparative Example 1, are used in bundles of three metal wires. In Comparative Example 2, due to the difference in tensile strength, about 9% more metal wires are used than in Comparative Example 1, and thus, the interval δG between the metal wire bundles is set to be 0.24 mm, which is narrower than the interval of 0.33 mm used in Examples 1 through 5.

In Example 8, the wire diameter of the metal wires is 0.17 mm, and in Example 9, the wire diameter of the metal wires is 0.37 mm. In both, PEN fibers are used in the cap layer and the carcass cords. Example 10 uses bundles of seven metal wires each having a wire diameter of 0.21 mm, and the interval δG between the metal wire bundles is set to be 0.77 mm wide.

bination with a cap layer formed of organic fibers, and a cap layer of PEN fibers in particular.

It can also be seen that the comfort of the ride was improved by a combination with the cap layer. In particular, preferable effects were exhibited by using PEN fibers in both the cap layer and the carcass ply cord.

With regard to the maneuvering stability, the effects resulting due to the provision of the cap layer in particular were marked, and the weakness of the belt rigidity in a metal wire which lacks the cap layer was compensated for and the stability improved. In the same way as mentioned above, use of PEN fibers resulted in the most preferable effects.

It is known that, generally, for two layer belts of steel cords of twisted structures, placement of a cap layer at the radial direction outer side thereof leads to a deterioration in the rolling resistance of the tire. However, as in the present invention, by combining the cap layer with a belt layer formed of bundles of metal wires which are not twisted and are relatively thin, the rolling resistance can be fairly improved, as can be seen from Table 1.

When, for example, a twisted structure of 1×3 twisted filaments such as in FIG. 5 is used, the cord diameter is large (and is even larger when open cords are used) and the covering rubber gauge G1 is thick, as compared with a belt layer in which untwisted metal wires are bundled and used as in the present invention, and this is disadvantageous with respect to

TABLE 1

| Item | Comp. Ex. 1 | Comp. Ex. 2 | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|---|
| Structure of Reinforcing Material | uniformly embedded | 3-wire bundle | 3-wire bundle | 3-wire bundle | 3-wire bundle | 3-wire bundle | 3-wire bundle | 3-wire bundle | 4-wire bundle | 3-wire bundle | 3-wire bundle | 7-wire bundle |
| Wire Diameter (mm) of Metal Wires | 0.21 | 0.21 | 0.21 | 0.21 | 0.21 | 0.21 | 0.21 | 0.26 | 0.21 | 0.17 | 0.37 | 0.21 |
| Tensile strength (MPa) of Metal Wires | 3626 | 3332 | 3626 | 3626 | 3626 | 3626 | 3626 | 3479 | 3626 | 3430 | 3038 | 3626 |
| Carbon Content (% by weight) | 0.8 | 0.7 | 0.8 | 0.8 | 0.8 | 0.8 | 0.8 | 0.8 | 0.8 | 0.8 | 0.8 | 0.8 |
| Coating $G_1$ | 1.4 | 1.4 | 1.4 | 1.4 | 1.4 | 1.4 | 1.4 | 1.8 | 1.4 | 0.96 | 2.1 | 1.4 |
| Gage (mm) $G_2$ | 0.5 | 0.5 | 0.5 | 0.5 | 0.5 | 0.5 | 0.5 | 0.64 | 0.5 | 0.31 | 0.68 | 0.5 |
| Interval Between Bundles δG (mm) | 0.11 | 0.24 | 0.33 | 0.33 | 0.33 | 0.33 | 0.33 | 0.62 | 0.44 | 0.08 | 1.38 | 0.77 |
| Indicated Denier Structure of Cap Layer | none | none | NY 1260d/2 | PET 1500d/2 | PEN 1500d/2 | PEN 1000d/2 | PEN 1500d/2 | PEN 1500d/2 | PEN 1500d/2 | PEN 1500d/2 | PEN 1500d/2 | PEN 1500d/2 |
| Indicated Denier Structure of Carcass Cord | PET 1500d/2 | PET 1500d/2 | PET 1500d/2 | PET 1500d/2 | PET 1500d/2 | PEN 1500d/2 | PEN 1500d/2 | PEN 1500d/2 | PEN 1500d/2 | PEN 1500d/2 | PEN 1500d/2 | PEN 1500d/2 |
| Belt End Portion Separation Resistance | 100 | 120 | 200 | 230 | 250 | 230 | 250 | 400 | 350 | 90 | 600 | 450 |
| Comfort of Ride | 100 | 100 | 101 | 102 | 103 | 105 | 105 | 105 | 105 | 107 | 103 | 105 |
| Maneuvering Stability | 100 | 100 | 102 | 104 | 106 | 110 | 110 | 110 | 110 | 100 | 112 | 110 |
| Rolling Resistance | 100 | 99 | 103 | 102 | 101 | 103 | 101 | 100 | 101 | 105 | 92 | 101 |
| Belt Fracture Resistance | 100 | 100 | 108 | 112 | 112 | 110 | 112 | 105 | 112 | 104 | 90 | 111 |
| Road Noise | 100 | 100 | 104 | 108 | 114 | 114 | 116 | 114 | 113 | 102 | 110 | 114 |
| Calendering Workability | ○ | ○ | ○ | ○ | ○ | ○ | ○ | ○ | ○ | ○ | ○ | Δ |

The last rows of Table 1 show the results of comparative evaluation of the tire performances of the Examples and Comparative Examples, with the performances of the tire of Comparative Example 1 being an index of 100. As can be seen from the results of Examples 1 through 10, the belt end portion separation resistance was greatly improved by using the bundled cords of metal wires and making the interval δG between the metal wire bundles to be wide. The effects were particularly marked when such a structure was used in comthe rolling resistance of the tire. From the standpoint of the cord strength as well, in order to compensate for the deterioration in belt strength caused by the twisting loss, a large number of steel cords are required and the weight increases. This is also a cause of deterioration in rolling resistance.

It can be seen that, in the tires of the present invention, due to the combination with the cap layer, the rigidity of the belt increases and the resistance against wire fracturing of the belt improves.

Generally, there is the tendency for a lightening of the weight of a tire to result in worse road noise. However, in the present invention, this is improved by the combination of the cap layer with the belt layer.

In the case of the tire of Example 8 which is an example in which the wire diameter of the metal wires is small, in order to maintain the total strength of the belt, the number of embedded cords is increased, and the interval δG between the metal wire bundles which are each formed by three wires is small. This structure is somewhat disadvantageous with respect to resistance to belt end portion separation. However, it should be noted that, in this structure, the level of the belt end portion separation resistance is substantially the same as that of the comparative tires.

In Example 10 in which the number of wires in the metal wire bundles was large, there was no problem with respect to tire performances. However, in order to stabilize the characteristics of the metal wire bundle, the rubber covering processing speed in the calendering process was somewhat slow, which presented some problems with regard to produceability.

The methods of testing used in the present Examples are described hereinafter.

<Belt End Portion Separation Resistance Test>

The test tire was assembled to a standard rim, inflated to an internal pressure of 1.5 kgf/cm$^2$, and mounted on a passenger vehicle for testing. After traveling on regular roads for 60,000 km, the tire was dissected, and the length of the crack which was generated at the belt edge was measured. The reciprocal of the crack length of each test tire was computed, and the reciprocal value of the control tire of comparative example 1 was used as an index of 100. The higher the index value, the better the resistance to belt end portion separation.

<Comfort of Ride Test>

The test tire was loaded with a predetermined load and was pressed on an iron drum for tire testing which had an outer diameter of 2 m and on which was mounted a projection having a width of 2 cm and a height of 1 cm. The drum was then rotated. The waveform of the vibration in the vertical load direction at the time the tire rode over the projection on the drum was measured by using an accelerometer. The reciprocal of the amplitude of the first cycle was determined, and the control tire of comparative example 1 was expressed as an index of 100. The higher the index, the better the comfort of the ride.

<Maneuvering Stability Test>

The test tire, which was adjusted in accordance with JIS D4202, was set on a drum tester having an outer diameter of 3 m. A load, which was determined from the predetermined size and internal pressure, was applied to the tire, and the tire was preliminarily run for 30 minutes at a speed of 30 km/h. Thereafter, in order to remove the effects of the increase in internal pressure due to the increase in temperature, the load was removed and the internal pressure was readjusted to a standard value. Thereafter, at the same speed and under the same load, slip angles from ±1° to ±4° were applied one degree by one degree continuously in positive and negative directions. The cornering force (CF) per unit angle for each of the positive and negative angles was measured, and the average value thereof was computed and used as the cornering power (CP). The CP of each test tire was divided by the CP of the conventional tire to determine an index. The higher the index, the better the maneuvering stability.

<Rolling Resistance>

The measurement of the rolling resistance was carried out in accordance with SAE J1269, and was expressed as an index with the index of the control tire of comparative example 1 being 100. The higher the index, the lower the rolling resistance.

<Belt Fracturing Resistance Test>

In this test, the test tire was mounted to an actual vehicle, and the vehicle traveled for 20,000 km at a speed of 60 km/h on a winding road which curved uniformly. Thereafter, the test tire was dissected, and the reinforcing material within the belt layer (the metal wire bundles or single metal wires) was removed. The number of reinforcing materials in a fractured state was determined, and the reciprocal thereof was expressed as an index with the control tire of comparative example 1 being 100. The higher the index, the better the belt fracturing resistance.

<Road Noise Test>

Test tires of a size of 175/70R14 were assembled to standard rims, and were mounted to the four wheels of a sedan-type passenger vehicle having a cubic capacity of 2000 cc. Two persons rode in the vehicle, and the vehicle was driven at a speed of 60 km/h on a test course for evaluation of road noise. A noise-collecting microphone was mounted to the center of the reverse surface of the seat back of the driver's seat. The total sound pressure (decibels) at frequencies of 100 to 500 Hz and 300 to 500 Hz was measured. The measured value was expressed as an index with the control tire of Comparative Example 1 being an index of 100. The higher the index, the better the road noise.

<Calendering Processing Workability Test>

The time required for the work of preparing wires and the rolling (calender) work before combining the wires and the rubber was measured, and was compared with the work time for the conventional cords. If the time was about the same, an evaluation mark of ○ was given. If the time increased by 20% or less, a mark of Δ was given. If the time increased even more, a mark of × was given.

As described above, in accordance with the tires based on the present embodiment, it is possible to provide radial tires in which the drawbacks of the conventional art are overcome, and which are lightweight and which greatly suppress deterioration in performances of the tire which usually accompanies the lightening of the weight of the tire, or even improve the tire performances.

Second Embodiment

Next, a radial tire of a second embodiment of the present invention will be described concretely with reference to FIG. 7 and FIGS. 2 through 6. In the present embodiment, members which are the same as those of the previously-described first embodiment are denoted by the same reference numerals, and description relating thereto will basically be omitted.

Figure 7:
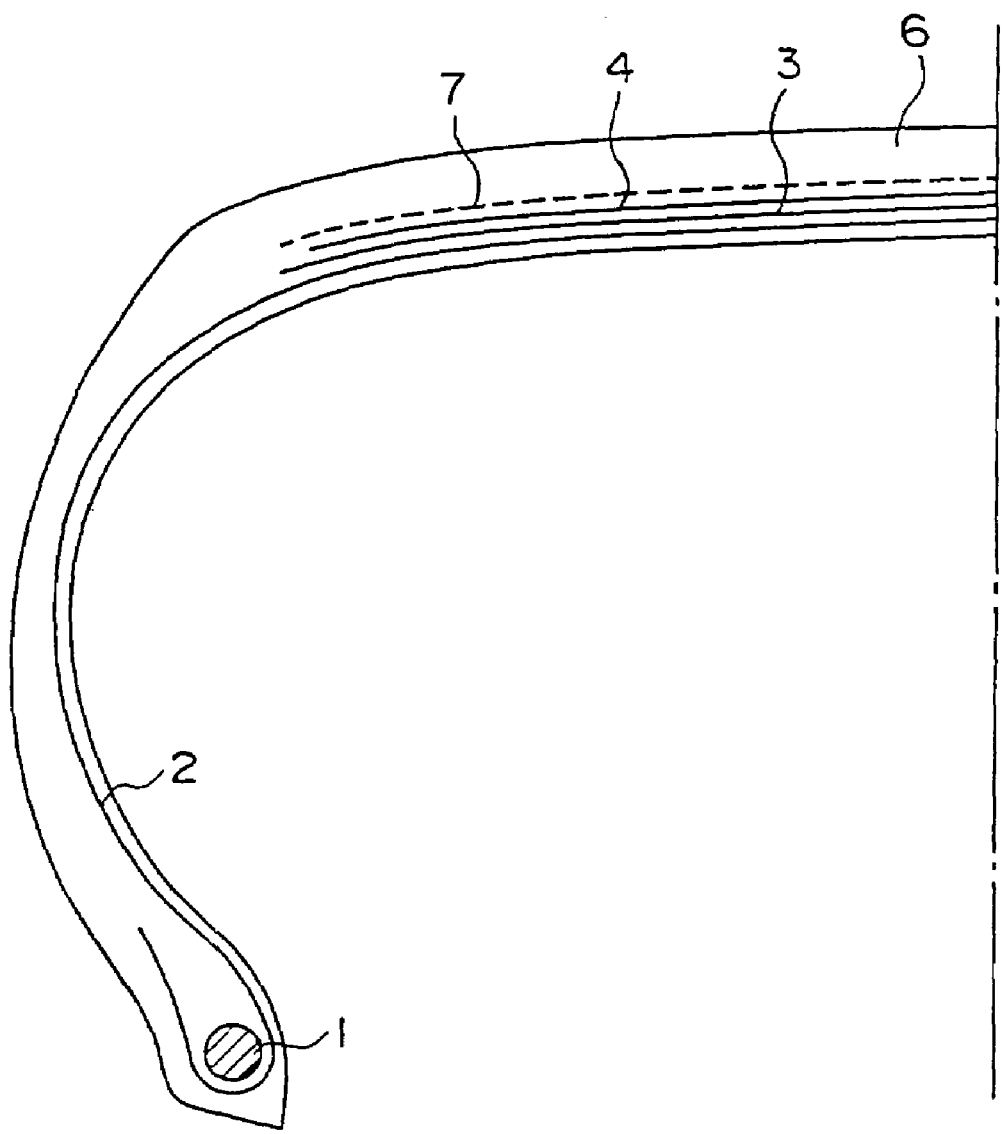
FIG. 7 is a cross-sectional view of a left half of a radial tire in accordance with a second embodiment of the present invention.

As shown as one example in the left half cross-sectional view of FIG. 7, the radial tire of the present embodiment basically includes the carcass layer 2 which is formed of at least one radial carcass ply disposed between the pair of bead members 1, the tread 6 disposed at the tire radial direction outer side of a crown region of the carcass layer and forming a ground-contact portion, and a belt layer formed of at least two belt plies (here, the belt plies 3, 4) which are formed of rubber-coated metal wires and which are disposed between the tread and the crown region of the carcass layer.

Further, at least one reinforcing layer 7, which is formed of rubber or whose main component is rubber, is disposed between the tread and the belt layer.

The structure and effects of the belt layer of the present embodiment are similar to those of the belt layer of the first embodiment, and therefore, detailed description thereof will be omitted.

One important feature of the radial tire of the present embodiment is that, as described above, the at least one reinforcing layer 7, which is rubber or whose main component is rubber, is disposed between the tread and the belt layer. By using this reinforcing layer, when the tire travels at high speed or is subjected to a large deformation, the sudden or large stress, which is inputted to the belt layer from the tread stepping surface, is mitigated and absorbed, and the belt layer of the present invention which is formed from an arrangement of bundles of single metal wires (monofilaments) is effectively protected without being damaged. Accordingly, wire fracturing and wire separation at the belt layer can be suppressed, and the durability of the tire is markedly improved.

The improvement in the durability of the belt layer is exhibited most when the width, in the tire width direction, of the reinforcing layer which is rubber or whose main component is, is in a range of 70 to 110% of the width of the tire radial direction innermost belt ply. When the width, in the tire width direction, of the reinforcing layer is less than 70% of the width of the innermost belt ply, there is the concern that it may not be possible to suppress the fracturing and separation of wires in vicinities of the end portions of the belt layer in particular. Further, this ratio exceeding 110% is unnecessary, and when the ratio does exceed 110%, there is the concern that the comfort of the ride and the road noise may deteriorate.

The thickness of the reinforcing layer is preferably 0.2 to 1.2 mm, and more preferably 0.3 to 0.8 mm. When the thickness of the reinforcing layer is less than 0.2 mm, the aforementioned effects of protection and suppression of wire fracturing and wire separation are poor, and there is the concern that it may not be possible to sufficiently suppress wire fracturing and wire separation. The reinforcing layer being thicker than 1.2 mm runs counter to the object of decreasing the weight, and there is the concern that the comfort of the ride and the road noise may deteriorate.

It is preferable that the 100% tensile stress of the rubber portions of the reinforcing layer of the present embodiment is 1.0 to 8.0 MPa. When the 100% tensile stress is less than 1.0 MPa, the rubber is too soft and a sufficient reinforcing effect cannot be exhibited. When the 100% tensile stress exceeds 8.0 MPa, the rubber is too hard, and there is the concern that the effect of absorbing and mitigating inputs may decrease, or that the comfort of the ride and the feeling may even be adversely affected.

The 100% tensile stress of the rubber portions of the reinforcing layer of the present embodiment is preferably higher than the 100% tensile stress of the rubber of the tread of the tire. When the 100% tensile stress of the rubber portions of the reinforcing layer is less than that of the rubber of the tread, the aforementioned effect of protecting is poor, and the effect of reducing and absorbing inputs to the belt layer is poor.

There are two types of the reinforcing layer of the present embodiment: the type in which the aforementioned required properties are imparted by use of a rubber composition, and the type in which the aforementioned required properties are imparted by filling short fibers or the like in a rubber composition which is the main component.

In the reinforcing layer formed of a rubber composition, the aforementioned desired 100% tensile stress can be easily obtained by compounding a highly reinforcing carbon black, e.g., a high reinforcing grade carbon black such as SAF, ISAF, HAF, FEF, GPF, SRF, or the like, in a relatively large amount of preferably 40 to 80 parts by weight with respect to 100 parts by weight of the rubber composition.

In order to impart the requisite properties to the reinforcing layer by adding a reinforcing material to the rubber composition which is the main component, by adding short organic fibers or short metal fibers to the rubber composition, a reinforcing layer whose main component is rubber and which has the aforementioned properties can be easily obtained. The short fibers to be added are not particularly limited, and examples thereof include organic fibers which are usually used for reinforcing tires, such as polyester fibers, aliphatic polyamide fibers, aromatic polyamide fibers, rayon fibers or the like, and metal fibers such as steel fibers, stainless steel fibers, and the like. Among these, polyethylene terephthalate fibers, polyethylene naphthalate fibers, nylon 6 or nylon 66 fibers, aramide fibers, steel fibers, and the like are suitably used. In order for the reinforcing effects to be markedly exhibited when adding such short fibers, it is desirable that the ratio L/d (aspect ratio) of the fiber length L with respect to the fiber diameter d is 3 to 100. In the case of using a reinforcing layer in which are filled short fibers and in particular short fibers having a large aspect ratio L/d, the short fibers being oriented in the tire circumferential direction is useful for protecting the belt layer of the present invention and for increasing the belt rigidity, which is preferable in the present embodiment.

The cords of the radial carcass ply of the present embodiment are the similar to those of the first embodiment, and therefore, description thereof will be omitted.

To summarize, in the radial tire of the present embodiment, bundles, in which a plurality of single metal wires are disposed substantially planarly without being twisted, are aligned planarly and in parallel in the belt ply with intervals therebetween. In this way, a belt layer, which is lightweight and has high rigidity in the circumferential direction and which can suppress the generation and propagation of belt end portion separation, can be realized. Due to this improved belt layer, and to the reinforcing layer which is made of rubber or whose main component is rubber and which is disposed between the tread and the belt layer, it is possible to provide a high-performance, lightweight radial tire having improved rolling resistance and durability.

EXAMPLES

Hereinafter, Examples of the present embodiment will be explained with reference to the drawings and the tables.

In the present Examples, a belt layer formed of two belt plies having the specifications shown in the upper rows of Table 2, and a rubber reinforcing layer having the specifications shown in the middle rows of Table 2, were applied to pneumatic radial tires having the cross-sectional structure shown in FIG. 7 and of the size 175/70R14.

In Examples 1 through 3, metal wires of wire diameters of 0.30 φ, 0.21 φ, and 0.26 φ respectively were bundled in groups of three wires and were embedded in covering rubber so as to be aligned in parallel in the width direction of the belt layer, as shown in FIG. 2. The width of the rubber reinforcing layer was 100%, 80% and 100% of the width of the first belt ply 3, respectively.

Neither of the Comparative Examples had a rubber reinforcing layer. The belt ply of Comparative Example 2 was the same as that of Example 1, and the belt ply of Comparative Example 1 was formed of the twisted cords of three metal wires shown in FIG. 5.

TABLE 2

| | Item | Comp. Ex. 1 | Comp. Ex. 2 | Ex. 1 | Ex. 2 | Ex. 3 |
|---|---|---|---|---|---|---|
| Belt Ply Specifications | Diameter (mm) of metal wire (arrangement/structure) | 0.30 φ 1 × 3 twists | 0.30 φ 3-wire bundle | 0.30 φ 3-wire bundle | 0.21 φ 3-wire bundle | 0.26 φ 3-wire bundle |
| | Tensile strength (MPa) of metal wire | 3234 | 3234 | 3234 | 3871 | 3626 |
| | Number of embedded wires (wires/50 mm) | 30 | 30 | 30 | 48 | 34 |
| Rubber Reinforcing Layer | Width (%) of rubber reinforcing layer (ratio to width of the radially innermost belt ply) | — | — | 100 | 80 | 100 |
| | Thickness (mm) of rubber reinforcing layer | — | — | 0.7 | 0.5 | 0.8 |
| | 100% tensile stress of rubber (ratio to tread rubber) | — | — | 125 | 140 | 110 |
| Evaluation | Belt fracture resistance (index) | 99 | 100 | 150 | 185 | 175 |
| | Belt separation resistance (index) | 108 | 100 | 108 | 103 | 105 |

Each of the tires of the Examples and Comparative Examples were subjected to a belt fracturing resistance test and a belt separation resistance test of the belt layer. The results of these tests are given in the lower rows of Table 2.

As can be seen from the results of Examples 1 through 3, the radial tire of the present embodiment, which has a rubber reinforcing layer and which uses a belt layer which is formed of belt plies in which metal wires are aligned in bundles, is a tire which has excellent durability in which belt fracturing and belt separation are suppressed.

Further, the above Examples are examples in which the reinforcing layer is formed of a rubber composition. However, the same effect or an even greater effect of improving durability can be seen even if a reinforcing layer is used whose main component is a rubber composition and into which short fibers or the like are filled.

Hereinafter, the test methods carried out in the present Examples will be described.

<Belt Separation Resistance Test>

The test tire was assembled to a standard rim, inflated to an internal pressure of 1.5 kgf/cm$^2$, and mounted to a passenger vehicle for testing. After traveling on regular roads for 60,000 km, the tire was dissected, and the length of the crack which was generated in the belt layer was measured. The reciprocal of the crack length of each test tire was computed, and the reciprocal value of the tire of comparative example 2 was used as an index of 100. The higher the index value, the better the resistance to belt separation.

<Belt Fracture Resistance Test>

This test was carried out in the same way as the belt fracture resistance test of the previously-described first embodiment, and therefore description thereof will be omitted.

As described above, in accordance with the radial tires based on the present embodiment, it is possible to provide radial tires in which the drawbacks of the conventional art are overcome, and which are lightweight and which greatly suppress deterioration in performances of the tire which usually accompanies the lightening of the weight of the tire, or even improve the tire performances.

Third Embodiment

A radial tire relating to a third embodiment of the present invention will be described with reference to FIG. 8. The present embodiment is basically similar to the previously described first embodiment. The present embodiment differs from the first embodiment only in that, in the present embodiment, at least one reinforcing layer (which is the same as the reinforcing layer of the second embodiment), which is formed of rubber or whose main component is rubber, is disposed between the belt layer and the tread, and particularly preferably, between the cap layer and the belt layer. Accordingly, only those features of the present embodiment which differ from the first embodiment will be described, and contents which repeat description given with respect to the first and second embodiments will be omitted.

Figure 8:
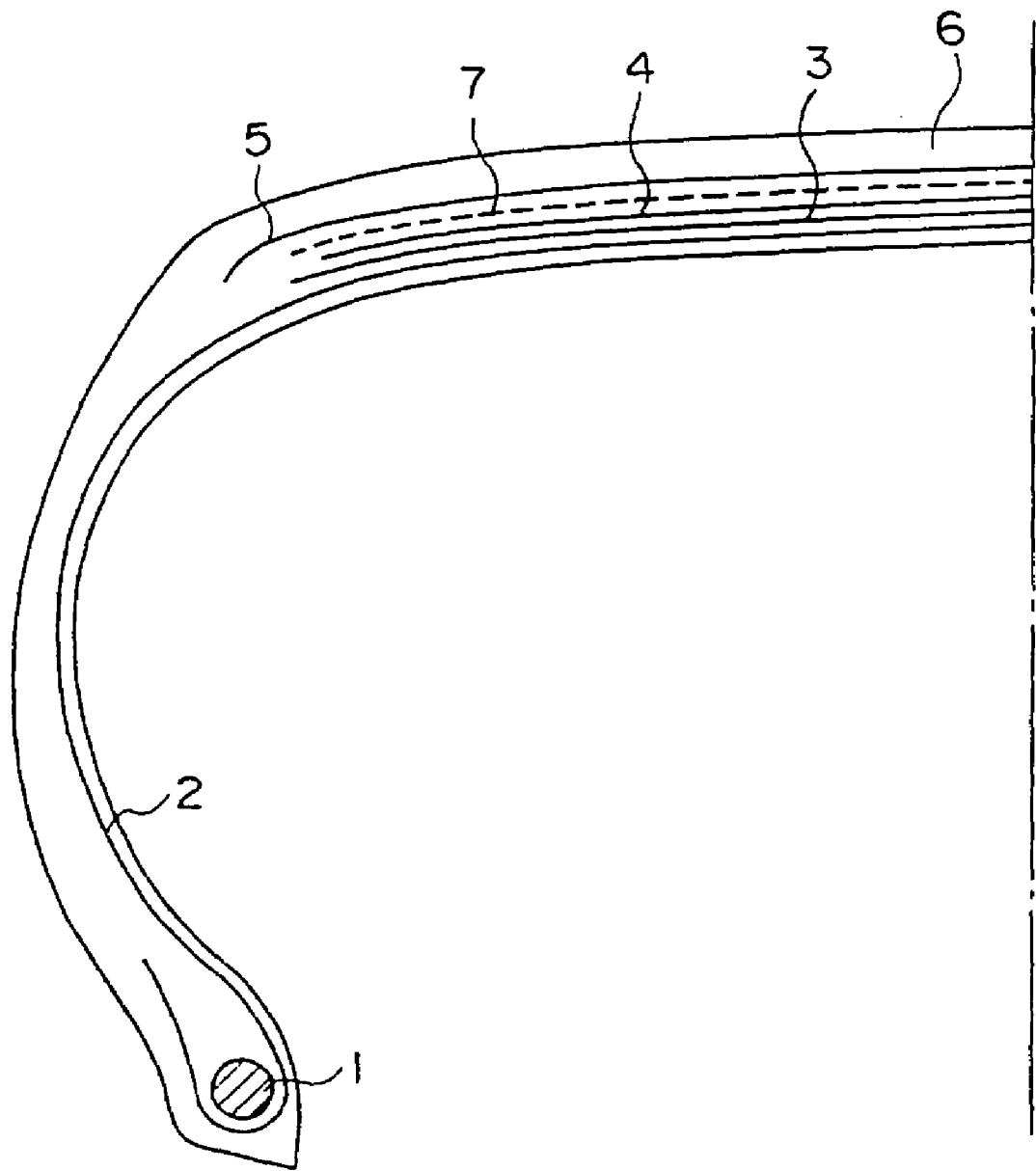
FIG. 8 is a cross-sectional view of a left half of a radial tire in accordance with a third embodiment of the present invention.

As mentioned above, an important feature of the radial tire of the present embodiment is that the at least one reinforcing layer 7, which is formed of rubber or whose main component is rubber, is disposed between the tread and the belt layer, and particularly preferably, between the cap layer and the belt layer (as shown in the left half cross-sectional view of FIG. 8). This reinforcing layer 7 is the same as that of the second embodiment.

The other structures are the same as those of the first embodiment (and therefore, description thereof will be omitted).

In the present embodiment, by combining the reinforcing layer of the second embodiment into the structure of the first embodiment, the effects of improving circumferential direction rigidity and of mitigating inputs to the belt layer are even more marked, and the durability and traveling performances of the tire can be improved even more. Namely, it is possible to provide radial tires which are lightweight and which greatly suppress deterioration in performances of the tire which usually accompanies the lightening of the weight of the tire, or which improve the performances of the tire.

What is claimed is:

1. A radial tire comprising:
a carcass layer formed of at least one radial carcass ply disposed between a pair of bead members;
a tread disposed at a tire radial direction outer side of a crown region of the carcass layer, and forming a ground-contact portion;
a belt layer formed of at least two belt plies each formed from rubber-coated metal wires, and disposed between the tread and the crown region of the carcass layer, the belt layer being structured such that, in at least one belt ply of the belt layer, at least a majority of metal wires in the ply exist as metal wire bundles in which a plurality of metal wires of circular cross-sections and substantially equal wire diameters are aligned in parallel without being twisted together, the metal wire bundles being aligned planarly and in parallel with intervals between the metal wire bundles in the width direction of the belt layer; and
at least one cap layer in which organic fibers are covered with rubber and which is disposed between the tread and the belt layer;
wherein at least one reinforcing layer, which is formed of rubber, is disposed between the tread and the belt layer;
wherein a number of metal wires in the metal wire bundles is 3 to 9,
wherein a 100% tensile stress of rubber portions of the reinforcing layer is higher than a 100% tensile stress of rubber of the tread, and
wherein the belt layer is formed of two belt plies, and given that G1 is a total thickness of the two plies, G2 is an interval between metal wires of a radial direction inner side ply and metal wires of a radial direction outer side ply, and δG is an interval between the metal wire bundles in each ply, relationships of the following formulae are satisfied.

2. A radial tire according to claim 1, wherein the belt layer is formed of two belt plies.

3. A radial tire according to claim 1, wherein the belt layer is structured such that, in all of the belt plies of the belt layer, at least a majority of metal wires in the ply exist as metal wire bundles in which a plurality of metal wires of circular cross-sections and substantially equal wire diameters are aligned in parallel without being twisted together, the metal wire bundles being aligned planarly and in parallel with intervals between the metal wire bundles in the width direction of the belt layer.

4. A radial tire according to claim 1, wherein a value of an aspect ratio DS/DL of a short diameter DS to a long diameter DL of the metal wire bundle in a cross section orthogonal to the longitudinal direction of the metal wire bundle is substantially $1/n$, where n is a number of metal wires in the metal wire bundle.

5. A radial tire according to claim 1, wherein a number n of metal wires in the metal wire bundle is 3 to 6.

6. A radial tire according to claim 1, wherein a wire diameter of the metal wires in the belt layer is 0.18 to 0.35 mm, and a tensile strength of the metal wires in the belt layer is 3130 to 4410 MPa.

7. A radial tire according to claim 1, wherein a wire diameter of the metal wires in the belt layer is 0.19 to 0.28 mm, and a tensile strength of the metal wires in the belt layer is 3430 to 4410 MPa.

8. A radial tire according to claim 1, wherein a material of the metal wires in the belt layer is a steel material containing at least 0.7% by weight carbon.

9. A radial tire according to claim 1, wherein the metal wires in the belt layer form an angle of 15 to 35° with respect to an equatorial plane of the tire.

10. A radial tire according to claim 1, wherein the organic fibers in the cap layer are aligned substantially parallel to a tire circumferential direction.

11. A radial tire according to claim 1, wherein a material of the organic fibers in the cap layer is polyethylene naphthalate.

12. A radial tire according to claim 1, wherein a material of cords of the radial carcass ply is polyethylene naphthalate.

13. A radial tire according to claim 1, wherein at least one reinforcing layer, which is formed of rubber or whose main component is rubber, is disposed between the cap layer and the belt layer.

14. A radial tire according to claim 13, wherein a width, in the tire with direction, of the reinforcing layer is 70 to 110% of a width, in the tire width direction, of a tire radial direction innermost side belt ply.

15. A radial tire according to claim 13, wherein a thickness of the reinforcing layer is 0.2 to 1.2 mm.

16. A radial tire according to claim 13, wherein a thickness of the reinforcing layer is 0.3 to 0.8 mm.

17. A radial tire according to claim 13, wherein a 100% tensile stress of rubber portions of the reinforcing layer is 1.0 to 8.0 MPa.

18. A radial tire according to claim 13, wherein the reinforcing layer whose main component is rubber contains short organic fibers or short metal fibers.

* * * * *